United States Patent [19]

von der Crone

[11] 4,051,099
[45] Sept. 27, 1977

[54] PROCESS FOR THE DYEING OF THERMOPLASTICS IN THE MELT

[75] Inventor: Jost von der Crone, Riehen, Switzerland

[73] Assignee: Ciba-Geigy Corporation, Ardsley, N.Y.

[21] Appl. No.: 671,804

[22] Filed: Mar. 30, 1976

[30] Foreign Application Priority Data

Apr. 11, 1975 Switzerland .......................... 4648/75

[51] Int. Cl.² .............................................. C08K 5/24
[52] U.S. Cl. .................................. 260/40 P; 260/326.1
[58] Field of Search .......................... 260/326.1, 40 P

[56] References Cited

U.S. PATENT DOCUMENTS

| 3,385,864 | 5/1968 | Pugin et al. ......................... 260/326.1 |
| 3,483,213 | 12/1969 | Pugin et al. ......................... 260/326.1 |
| 3,758,497 | 9/1973 | Pugin et al. ..................... 260/326.1 X |
| 3,923,806 | 12/1975 | Bock et al. ..................... 260/326.1 X |

FOREIGN PATENT DOCUMENTS 1,187,667   4/1970   United Kingdom

Primary Examiner—Sandra M. Person
Attorney, Agent, or Firm—Vincent J. Cavalieri

[57] ABSTRACT

Process for the dyeing of thermoplastics in the melt, which process comprises the use of dyestuffs of the formula

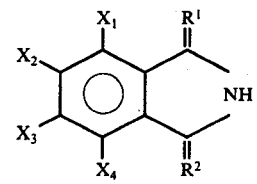

wherein $X_1 - X_4$ represents H-atoms or halogen atoms, or one or two of the radicals $X_1 - X_4$ represent alkyl, alkoxy, phenyl or phenoxy groups, and those remaining represent H-atoms, $R^1$ and $R^2$ represent radicals of methylene-active compounds, or radicals of the formula =N—A wherein A stands for the radical of an aliphatic, cycloaliphatic, araliphatic, aromatic or heterocyclic amine or hydrazine, whereby, provided that $R^1$ and $R^2$ represent radicals of the formula =N—A, one A represents a heterocyclic radical containing N-atoms, optionally together with O- or S-atoms.

9 Claims, No Drawings

PROCESS FOR THE DYEING OF THERMOPLASTICS IN THE MELT

The present invention relates to the dyeing of thermoplastics in the melt with dyestuffs of the formula

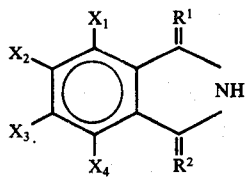

wherein $X_1 - X_4$ represent H-atoms or halogen atoms, or one or two of the radicals $X_1 - X_4$ represent alkyl, alkoxy, phenyl or phenoxy groups, and those remaining represent H-atoms, $R^1$ and $R^2$ represent radicals of methylene-active compounds, or radicals of the formula =N—A wherein A stands for the radical of an aliphatic, cycloaliphatic, araliphatic, aromatic or heterocyclic amine or hydrazine, whereby, provided that $R^1$ and $R^2$ represent radicals of the formula =N—A, one A represents a heterocyclic radical containing N-atoms, optionally together with O- or S-atoms.

Preferred dyestuffs are those of the formula

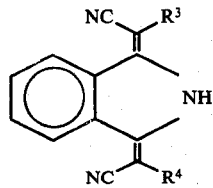

wherein $R^3$ and $R^4$ represent cyano, acyl, alkoxycarbonyl, carbamoyl or sulphamoyl groups, or radicals of the formula

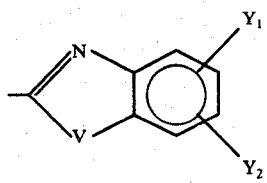

wherein V represents an O- or S-atom or an imino group, or an alkylimino group containing 1 - 4 C-atoms, $Y_1$ and $Y_2$ represent H-atoms or halogen atoms, or alkyl or alkoxy groups containing 1 - 4 C-atoms; and especially dyestuffs of the formula

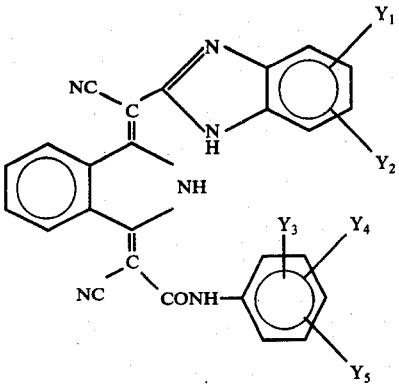

wherein $Y_1$ and $Y_2$ have the above-given meaning, $Y_3$ represents a H-atom or halogen atom, an alkyl or alkoxy group optionally substituted by alkoxy groups having 1 - 4 C-atoms, or phenoxy or phenyl groups, an alkanoylamino or alkylsulphonyl group having 1 - 4 C-atoms, an alkoxycarbonyl group having 2 - 6 C-atoms, a nitro, trifluoromethyl or cyano group, or a phenoxy group optionally substituted by halogen atoms, or by alkyl or alkoxy groups having 1 - 4 C-atoms, $Y_4$ and $Y_5$ represent H-atoms or halogen atoms, or alkyl or alkoxy groups having 1 - 4 C-atoms.

Dyestuffs likewise preferred are those of the formula

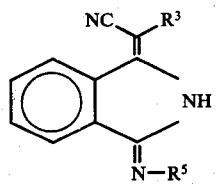

wherein $R^3$ has the aforesaid meaning, and $R^5$ represents an aromatic or heterocyclic radical; and especially those of the formula

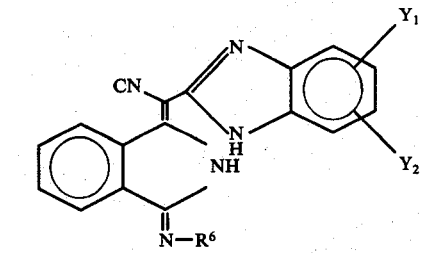

wherein $Y_1$ and $Y_2$ have the aforesaid meaning, and $R^6$ represents a radical of the formulae

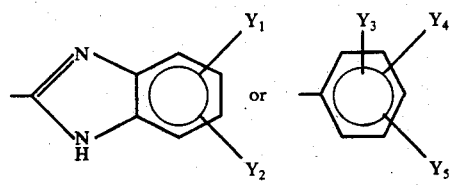

wherein $Y_1 - Y_5$ have the aforesaid meaning.

Also preferred are dyestuffs of the formulae

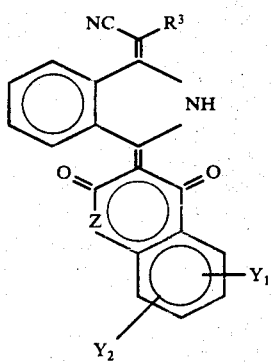

and

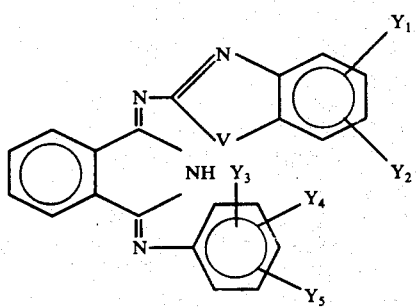

wherein $R^3$, V, $Y_1 - Y_5$ have the above meaning, and Z represents an O-atom or S-atpm or an NH-group. $R_3$ stands preferably for a radical of the formulae

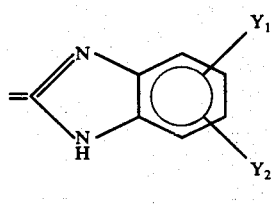

or

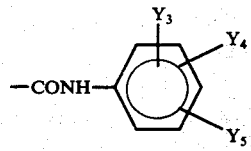

The mentioned dyestuffs constitute for the most part known compounds that can be obtained by the processes described in the GB-patent specification No. 1,187,667, for example starting with 1,3-diiminoisoindoline according to the following reaction sequence:

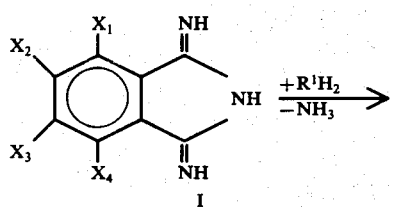

-continued

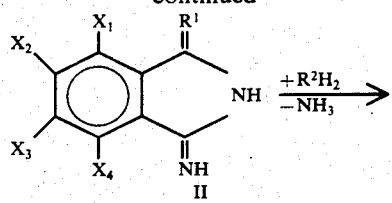

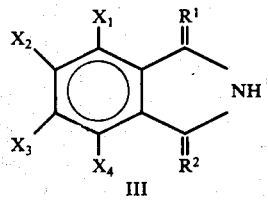

The 1,3-diiminoisoindoline to be used as starting material can be present or react also in its tautomeric form as amino-imino-isoindolenine.

The following diiminoisoindolines may be mentioned as examples:

1,3-diimino-isoindoline,
1,3-diimino-5-methyl-isoindoline,
1,3-diimino-5-methoxy-isoindoline,
1,3-diimino-6-methoxy-isoindoline,
1,3-diimino-5-phenoxy-isoindoline,
1,3-diimino-5-phenyl-isoindoline,
1,3-diimino-6-phenyl-isoindoline,
1,3-diimino-4-chloro-isoindoline,
1,3-diimino-5-chloro-isoindoline,
1,3-diimino-6-chloro-isoindoline,
1,3-diimino-7-chloro-isoindoline,
1,3-diimino-5,6-diphenyl-isoindoline,
1,3-diimino-4,5-dichloro-isoindoline.

Suitable starting materials are also the 1,3,3-trichloro-isoindole derivatives of the formula

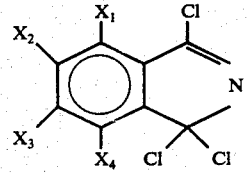

wherein $X_1 - X_4$ have the aforementioned meaning, for example 1,3,3-trichloro-isoindolenine, or 1,3,3,4,5,6,7-hept chloro-isoindolenine.

From the trichloro-isoindolenines there are obtained, by reaction with ammonia or with amines or with alkali alcoholates, amino- or alkoxy-isoindolines which likewise are suitable as starting materials.

As compounds $R^1H_2$ and $R^2H_2$, which react successively with the 1,3-diiminoisoindolines or trichloroisoindolenines there are mentioned:

a. malonic acid-dialkyl esters such as malonic acid-dimethyl ester or malonic acid-diethyl ester, or malonic acid dinitrile;

b. cyanoacetic acid alkyl esters, the alkyl radicals of which can be derived from the widest variety of alcohols, such as from methanol, ethanol, normal-, iso- and tert.-butanol and amyl alcohols; from mixtures of $C_6 - C_8$ alcohols such as are generally obtainable by known syntheses; from alcohols of the aliphatic series such as lauryl alcohol or octadecanol; from cycloaliphatic alcohols such as cyclohexanol or menthol; from aliphatic alcohols containing further substituents, such as glycolmonoalkyl ether, ethylenechlorohydrin, β-cyanethanol, β-phenoxy- or β-phenylmercaptoethanol, β-phenylethyl alcohol, γ-phenyl-propanol, γ-phenylallyl alcohol; from benzyl alcohol and substitution products thereof, such as 4-methyl-, 2- and 4-chloro-, 3,4-dichloro- 2,4,6-trichlorobenzyl alcohols; or from alcohols derived from heterocycles, such as tetrahydrofurfural alcohol;

c. cyanacetamides, the amide radicals of which can be derived from ammonia and from the widest range of primary or secondary amines, such as methyl-, ethyl- or butylamine, 3-methoxypropylamine, anilines, for example 2-, 3- or 4-chloroaniline, 2,4-, 3,4- or 2,5-dichloroaniline, 2-, 3- or 4-methylaniline, 2,4-, 3,4- or 2,5-dimethylaniline, 2-, 3-or 4-methoxy- or -ethoxyaniline, 3-trifluoromethylaniline, 4-nitroaniline, 2,3- or 4-methoxycarbonylaniline or 4-phenoxyaniline;

d. β-cyano ketones, such as cyanoacetone and cyanoacetophenone;

e. benzyl cyanide, as well as derivatives thereof substituted in the 2-, 3- and/or 4-position by fluorine, chlorine or bromine, and 3- and 4-nitrobenzyl cyanide;

f. acetonitriles carrying heterocyclic substituents, such as pyrazolyl-(3)-acetonitrile, imidazolyl-(4)-acetonitrile,
2-cyanomethyl-benzimidazole,
2-cyanomethyl-6-methoxy-benzimidazole,
2-cyanomethyl-5,6-dimethyl-benzimimdazole,
2-cyanomethyl-5,7-dimethyl-benzimidazole,
2-cyanomethyl-6-chlorobenzimidazole,
2-cyanomethyl-5,6-dichlorobenzimidazole,
2-cyanomethyl-6-phenoxy-benzimidazole,
2-cyanomethyl-6-methyl-benzimidazole,
1-methyl-2-cyanomethyl-benzimidazole,
1-β-hydroxyethyl-2-cyanomethyl-benzimidazole,
1β-cyanoethyl-2-cyanomethyl-benzimidazole,
2-cyanomethyl-1H-naphth [2,3-d]-imidazole,
1-methyl-1,2,3-triazolyl-(4)-acetonitrile,
2-phenyl-1,2,3-triazolyl-(4)-acetonitrile,
5-phenyl-1,2,3-triazolyl-(4)-acetonitrile,
tetrahydrobenzo-1,2,3-triazolyl-(1)-acetonitrile,
4-phenyl-1,2,4-triazolyl-(3)-acetonitrile,
isoxazolyl-(3)-acetonitrile,
2-cyanomethyl-benzoxazole,
thiazolyl-(4)-acetonitrile,
2-methyl-thiazolyl-(4)-acetonitrile,
2-cyanomethyl-benzothiazole,
pyridyl-(2)-acetonitrile,
pyridyl-(3)-acetonitrile,
pyridyl-(4)-acetonitrile,
quinolyl-(2)-acetonitrile,
quinazolyl-(2)-acetonitrile,
quinoxalyl-(2)-acetonitrile;

g. iso- or heterocyclic ketomethylene compounds having a 5- or 6-membered ring, or hydroxy compounds that are able to react like ketomethylene compounds, such as:

3-methyl-pyrazolone-(5),
1-phenyl-3-methyl:pyrozolone-(5),
1,2-diphenyl-3,5-dioxo-pyrazolidine,
indoxyl, N-methyl-indoxyl, oxindole, N-methyl- and N-ethyl-oxindole, barbituric acid,
3-hydroxy-thionaphthene,
2,4-dioxo-1,2,3,4-tetrahydroquinoline,
N-methyl-2,4-dioxo-1,2,3,4-tetrahydroquinoline,
resorcin, dihydro-resorcin, phloroglucin,
1,3-diketohydrindene,
coumarins;

h. Primary amines of the heterocyclic series, such as:

1-phenyl-3-methyl-5-amino-pyrazole,
2-amino-benzimidazole,
1-methyl-2-amino-benzimidazole,
2-amino-benzoxazole,
2-amino-5-nitro-benzoxazole,
2-amino-4-phenyl-thiazole,
2-amino-4-methyl-5-carbethoxy-thiazole,
2-amino-benzothiazole,
2-amino-6-methoxy-, 6-ethoxy- and
-6-dimethylamino-benzothiazole,
3-amino-1,2,4-triazole,
3-amino-5-carbethoxy-1,2,4-triazole,
2-amino-1,3,4-oxidazole,
2-amino-5-cyclohexyl-, -5-benzyl- and 5-γ-pyridyl-1,3,4-oxidiazole,
2-amino-5-phenyl-1,3,4-oxdiazole,
5-amino-3-phenyl-1,2,4-thiadazole,
2-amino-5-phenyl-1,3,4-thiadiazole,
3-amino-sulpholane,
2-amino-pyridine.

Suitable as compounds $R^2H_2$, which can be reacted with the intermediate products (e.g. of the formula II), are also, for example:

i. primary amines of the aliphatic or aromatic series, such as methyl- and ethylamine,, 21 -hydroxy-ethylamine, ethylenediamine and γ-dimethylamino-propylamine, benzylamine, aniline, o-, m- and p-toluidine, xylidines, mesidine, 2-, 3- and 4-chloro- or alkoxy-anilines, 3-nitroaniline, 3- and 4-amino-acetanilide or -benzanilide, N-monophthalyl-p-phenylenediamine, 3- and 4-aminobenzoic acid ester, 3-and 4-cyananiline, 3-aminobenzamide or -benzanilide, 3-amino-benzenesulphoneamide and 2-phenyl-5-amino-benzotriazole-(1,2,3);

k. hydrazines having a free $NH_2$-group, such as hydrazine, 1.1-dimethyl-hydrazine, phenylhydrazine, halogeno- and nitro-phenylhydrazines, N-amino-piperidine, N-aminomorpholine, N-amino-2-methyl-2,3-dihydro-indole and N-amino-1,2,3,4-tetrahydroquinoline.

The dyestuffs according to the invention can be used as individual products or as mixtures in the dyeing process.

Thermoplastics which can be dyed with the dyestuffs mentioned are: polystyrene, ABS-rubber, polyamides and, in particular, linear polyesters. The corresponding spinning fibres are preferred.

As linear polyesters there may be mentioned, in particular, those which are obtained by polycondensation of terephthalic acid or esters thereof with glycols of the formula $HO-(CH_2)_n-OH$, wherein $n$ represents the number 2 - 10, or with 1,4-di(hydroxymethyl)-cyclohexane; or by polycondensation of glycol ethers of hydroxybenzoic acids, for example p-(β-hydroxyethoxy)-benzoic acid. The term 'linear polyesters' embraces also copolyesters that are obtained by partial replacement of the terephthalic acid with another dicarboxylic acid, and/or by partial replacement of the glycol with another diol.

Of particular interest however are the polyethylene terephthalates.

The linear polyesters to be dyed are intimately mixed advantageously in the form of powder, chips or granules with the dyestuff. This is carried out, for example, by sprinkling the polyester particles with the finely divided dry dyestuff powder, or by treating the polyester particles with a solution or dispersion of the dyestuff in an organic solvent and subsequently removing the solvent.

Finally, the substance to be dyed can also be added directly to the melted polyester, or it can be added before or during the polycondensation of the polyethylene terephthalate.

Depending on the depth of colour desired, the ratio of dyestuff to polyester can vary within wide limits. In general, the use of 0.01 – 3 parts of dyestuff to 100 parts of polyester is recommended.

The polyester particles treated in this manner are melted by known processes in the extruder, and moulded to form articles, particularly films or fibres, or they are cast into the form of sheets.

There are obtained evenly and thoroughly dyes articles having good fastness to light. The dyed fibres obtainable by the said processes are characterised also by good general textile fastness properties, especially fastness to wet-processing, dry-cleaning and heat. The dyestuffs have only a slight tendency to sublime away on application in the melt, an effect which results in particularly good fastness to bleeding and in only slight susceptibility to migration, as well as in good fastness to rubbing after thermofixing.

A special advantage of the dyestuffs to be used according to the invention is that they dissolve in the polyester melt and withstand surprisingly high temperatures of up to 300° C without decomposing, so that there are obtained dyeings that are considerably more clear than those obtained using insoluble pigments.

Except where otherwise stated in the following Examples, the term 'parts' denotes parts by weight; percentage denote per cent by weight, and temperature values are given in degrees Centigrade.

EXAMPLE 1

A non-delustered polyethylene terephthalate granulate suitable for producing fibres is shaken together with 1% of the dyestuff of the formula I

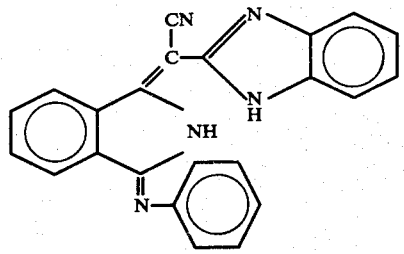

in a closable vessel on a shaking machine for 15 minutes. The evenly dyed granules are spun on a melt spinning machine (285° ± 3°, retention time in the spinning machine about 5 minutes) into filaments which are drawn and spooled on a draw twister. By virtue of the solubility of the dyestuff in polyethylene terephthalate, there is obtained a brilliant yellow dyeing which is characterised by outstanding fastness to light and by excellent fastness to washing, dry-cleaning, cross-dyeing and sublimation, as well as by a high resistance to chlorite bleaching.

There are given in the following Table further dyestuffs of the formula

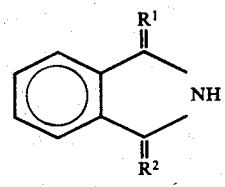

which are obtained by condensing 1,3-diimino-isoindoline stepwise with the compounds of the formulae $R^1H_2$ and $R^2H_2$ shown in Columns II and III. In Column IV are listd the shades of the resulting melt dyeings in polyester.

| No. | $R^1H_2$ | $R^2H_2$ | Shade of dyeing |
|---|---|---|---|
| 2 | 2-cyanomethyl-benzimidazole | 2-cyanomethyl-benzimidazole | red |
| 3 | " | 4-aminobenzoic acid ethyl ester | yellow |
| 4 | " | cyanoacetamide | orange |
| 5 | " | cyanoacetanilide | orange |
| 6 | 2-cyanomethyl-6-chloro-benzimidazole | " | orange |
| 7 | 2-cyanomethyl-benzimidazole | 2',5'-dichlorocyano-acetanilide | orange |
| 8 | " | 3',4'-dichlorocyano-acetanilide | orange |
| 9 | 2',4'-dimethyl-cyano-acetanilide | 4-methoxyaniline | yellow |
| 10 | 2-cyanomethyl-benzimidazole | 3,4-dichloroaniline | yellow |
| 11 | " | 4-chloroaniline | yellow |
| 12 | " | 4-methoxyaniline | yellow |
| 13 | " | 4'-methyl-cyano-acetanilide | orange |
| 14 | " | 4'-chloro-cyano-acetanilide | orange |
| 15 | 4'-chloro-cyanoacetanilide | " | yellow |
| 16 | 2-cyanomethyl-benzimidazole | 2'-ethoxycarbonyl-cyanoacetanilide | orange |
| 17 | 2-cyanomethyl-6-methoxy-benzimidazole | 4-chloroaniline | yellow |
| 18 | 2-cyanomethyl-5,6-dimethyl-benzimidazole | 4'-methyl-cyano-acetanilide | orange |
| 19 | 2-cyanomethyl-5,7-dimethyl-benzimidazole | " | orange |
| 20 | 2-cyanomethyl-6-methoxy-benzimidazole | 4'-chloro-cyano-acetanilide | orange |
| 21 | 2-cyanomethyl-6-ethoxy-benzimidazole | 4-chloroaniline | yellow |
| 22 | 2-cyanomethyl-6-methoxycarbonyl-benzimidazole | 4-chloroaniline | yellow |
| 23 | 2-cyanomethyl-5,6-dichloro-benzimidazole | cyanoacetanilide | red |
| 24 | 2-cyanomethyl-6-phenoxy-benzmimidazole | 4-chloroaniline | yellow |
| 25 | 2-cyanomethyl-6-methyl-benzimidazole | " | yellow |
| 26 | 4'-β-phenoxyethoxy-cyanoacetanilide | 4'-β-phenoxyethoxy-cyanoacetanilide | red |
| 27 | 2',3'-dichloroacetanilide | 2',3'-dichloroacetanilide | yellow |
| 28 | 2-cyanomethyl-benzimidazole | cyanoacetic acid methyl ester | orange |
| 29 | " | cyanoacetic acid ethyl ester | orange |
| 30 | " | cyanoacetic acid-β-methoxyethyl ester | orange |
| 31 | " | cyanoacetic acid-osibutyl ester | orange |
| 32 | 2-cyanomethyl-6-methoxy-benzimidazole | 4-β-phenoxyethoxy-aniline | yellow |
| 33 | 2-cyanomethyl-benzimidazole | 4'-phenoxy-cyano-acetanilide | red |
| 34 | " | 4'-β-phenoxyethoxy-cyanoacetanilide | red |
| 35 | " | 4-phenoxyaniline | yellow |
| 36 | " | benzylamine | yellow |

-continued

| No. | R¹H₂ | R²H₂ | Shade of dyeing |
|---|---|---|---|
| 37 | " | 4-β-butoxyethoxy-aniline | yellow |
| 38 | " | 4'-amino-dimethyl-diphenyl-methane | yellow |
| 39 | " | malonitrile | red |
| 40 | 2-aminobenzimidazole | 4-aminobenzoic ethyl ester | yellow |
| 41 | 2-aminobenzimidazole | 4-aminodiphenyl-ether | yellow |
| 42 | 2-amino-6-methoxy-benzimidazole | " | yellow |
| 43 | cyanoacetic acid ether ester | cyanoacetic acid ethyl ester | yellow |
| 44 | 1-methyl-2-cyanomethyl-benzimidazole | aniline | yellow |
| 45 | " | cyanoacetanilide | orange |
| 46 | 1-β-hydroxyethyl-2-cyanomethyl-benzimidazole | 4-chloroaniline | yellow |
| 47 | 1-β-cyanoethyl-2-cyanomethyl-benzimidazole | " | yellow |
| 48 | 2-cyanomethyl-benzimidazole | cyanoacetic acid cyclohexyl ester | orange |
| 49 | " | cyanoacetic acid benzyl ester | orange |
| 50 | cyanoacetanilide | 4-hydroxy-coumarin | orange |
| 51 | 4'-chloro-cyanoacetanilide | 4-hydroxy-6-methyl-coumarin | orange |
| 52 | 2-cyanomethyl-benzimidazole | 4-hydroxy-coumarin | orange |
| 53 | " | ethanolamine | yellow |
| 54 | " | aminoresorcin-di-o-cresyl ester | yellow |
| 55 | " | aminoresorcin-dimethyl ether | orange |
| 56 | " | 4-β-phenoxyethoxy-aniline | yellow |

EXAMPLE 57

A solution of 4 g of 2-cyanomethyl-benzimidazole and 25 ml of methanol is added dropwise to a suspension of 12.75 g of 1,3,3-trimorpholino-4,5,6,7-tetrachloroisoindolenine in 50 ml of methanol. Stirring is maintained for 1 hour at room temperature, and the temperature is subsequently raised to the reflux temperature, with the reaction mixture, from which the condensation product precipitates as a red-brown substance, being diluted with a further 50 ml of methanol. Filtration is performed hot and the residue is washed with methanol and water to obtain, after drying, 9.0 g of the dyestuff of the formula

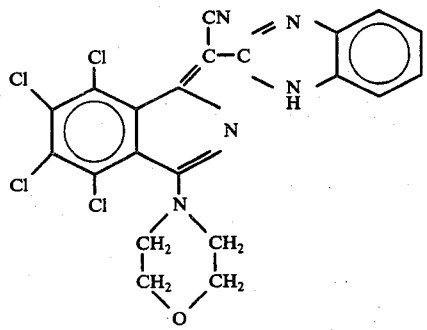

EXAMPLES 58 – 61

1000 parts of polyethylene terephthalate granulate and 10 parts of titanium dioxide and 1 part of the dyestuffs described in the following Table are mixed together in a closed vessel for 2 hours on a rolling device. The dyes granulate is extruded at about 260° into the form of strands of 2 mm diameter, and the material is again granulated. The granulate obtained is injection moulded at 270° – 280°, in an anchor injection-extrusion automatic machine, into moulded articles. There are obtained delustered, intensively dyed moulded shapes having good fastness to light.

In the following Table there are listed dyestuffs of the formula

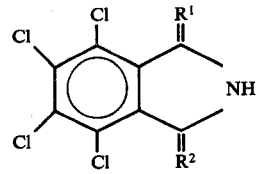

which are obtained if the dyestuffs produced according to Example 57 of the formula

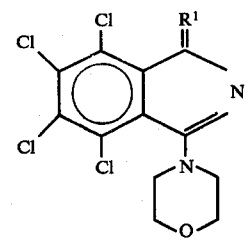

wherein R¹ is derived from the methylene-active compound given in Column II, are reacted with the compound R²H₂, given in Column III, in glacial acetic acid. Column IV shows the shade of the 1% dyed moulded articles made from polyesters. The dyeings are characterised by good fastness to light.

| No. | R¹H₂ | R²H₂ | Shade of dyeing |
|---|---|---|---|
| 58 | 2-cyanomethyl-benzimidazole | aniline | orange |
| 59 | " | 4-amino-diphenyl-ether | orange |
| 60 | " | cyanoacetanilide | orange |
| 61 | cyanoacetanilide | aniline | yellow |

I claim:
1. Process for the dyeing of thermoplastics in the melt, which process comprises the use of dyestuffs of the formula

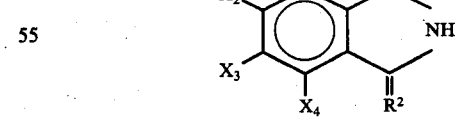

wherein $X_1$ – $X_4$ represents H-atoms or halogen atoms, or one or two of the radicals $X_1$ – $X_4$ represent alkyl, alkoxy, phenyl or phenoxy groups, and those remaining represent H-atoms, R¹ and R² represent radicals of methylene-active compounds, or radicals of the formula =N—A wherein A stands for the radical of an aliphatic, cycloaliphatic, araliphatic, aromatic or heterocyclic amine or hydrazine, whereby, provided that R¹ and R² represent radicals of the formula =N—A, one A represents a heterocyclic radical containing N-atoms, optionally together with O- or S-atoms.

2. Process according to claim 1, which process comprises the use of dyestuffs of the formula

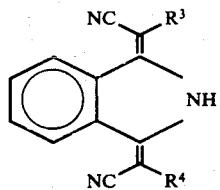

wherein $R^3$ and $R^4$ represent cyano, acyl, alkoxycarbonyl, carbamoyl or sulphamoyl groups, or radicals of the formula

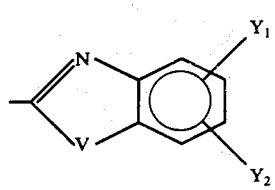

wherein V represents an O- or S-atom or an imino group, or an alkylimino group containing 1 - 4 C-atoms, $Y_1$ and $Y_2$ represent H-atoms or halogen atoms, or alkyl or alkoxy groups containing 1 - 4 C-atoms.

3. Process according to claim 2, which process comprises the use of dyestuffs of the formula

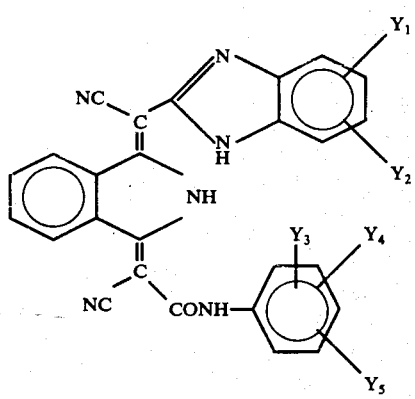

wherein $Y_1$ and $Y_2$ have the meaning given in claim 2, $Y_3$ represents a H-atom or halogen atom, an alkyl or alkoxy group optionally substituted by alkoxy groups having 1 - 4 C-atoms, or by phenoxy or phenyl groups, an alkanoylamino or alkylsulphonyl group having 1- 4 C-atoms, an alkoxycarbonyl group having 2 - 6 C-atoms, a nitro, trifluoromethyl or cyano group, or a phenoxy group optionally substituted by halogen atoms or by alkyl or alkoxy groups having 1 - 4 C-atoms, $Y_4$ and $Y_5$ represent H-atoms or halogen atoms, or alkyl or alkoxy groups having 1 - 4 C-atoms.

4. Process according to claim 1, which process comprises the use of dyestuffs of the formula

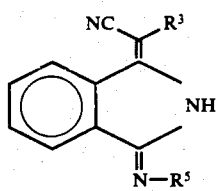

wherein $R^3$ has the meaning given in claim 2, and $R_5$ represents an aromatic or heterocyclic radical.

5. Process according to claim 4, which process comprises the use of dyestuffs of the formula

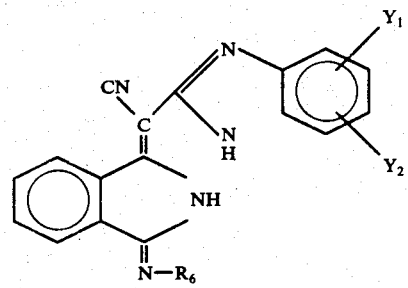

wherein $Y_1$ and $Y_2$ have the meaning given in claim 2, $R_6$ represents a radical of the formula

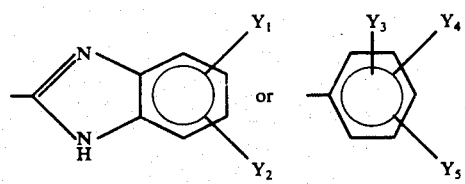

and $Y_1$ - $Y_5$ have the meaning given in claims 2 and 3.

6. Process according to claim 5, which process comprises the use of a dyestuff of the formula

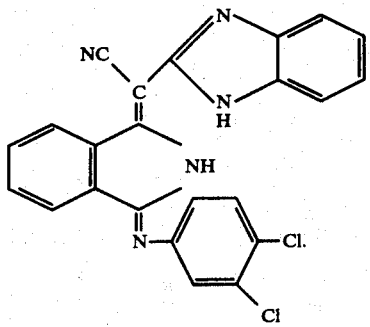

7. Process according to claim 5, which process comprises the use of a dyestuff of the formula

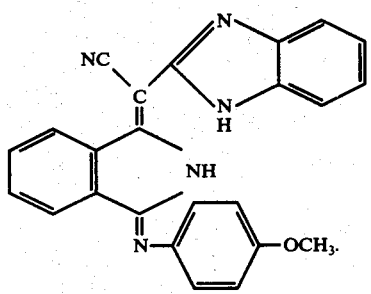

8. Process according to claim 1, wherein the thermoplastics dyed are spinning fibres.

9. Process according to claim 1, wherein the thermoplastics dyed are linear polyesters.

* * * * *